US010262070B1

(12) United States Patent
Bradish

(10) Patent No.: US 10,262,070 B1
(45) Date of Patent: *Apr. 16, 2019

(54) SUPPORTING PROXIMAL COMMUNICATION BETWEEN COMMUNICATION DEVICES AND BROADCAST STATIONS

(71) Applicant: CECELUMEN, LLC, Camarillo, CA (US)

(72) Inventor: Stillman Bradish, Washington, DC (US)

(73) Assignee: CECELUMEN, LLC, Camarillo, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 14/869,932

(22) Filed: Sep. 29, 2015

Related U.S. Application Data

(63) Continuation-in-part of application No. 14/617,983, filed on Feb. 10, 2015, now Pat. No. 9,693,222, and a continuation-in-part of application No. PCT/US2014/043573, filed on Jun. 23, 2014, application No. 14/869,932, which is a continuation-in-part of application No. 14/620,590, filed on Feb. 12, 2015, now Pat. No. 9,743,436.

(60) Provisional application No. 62/060,201, filed on Oct. 6, 2014, provisional application No. 62/056,986, filed on Sep. 29, 2014, provisional application No. 62/057,012, filed on Sep. 29, 2014, provisional application No. 61/938,836, filed on Feb. 12, 2014, provisional application No. 61/939,032, filed on Feb.

(Continued)

(51) Int. Cl.
G06F 17/30 (2006.01)
H04W 72/00 (2009.01)
H04W 88/06 (2009.01)
H04L 29/08 (2006.01)

(52) U.S. Cl.
CPC .... G06F 17/3087 (2013.01); G06F 17/30312 (2013.01); H04W 72/005 (2013.01); H04L 67/14 (2013.01); H04L 67/22 (2013.01); H04W 88/06 (2013.01)

(58) Field of Classification Search
CPC ....... H04W 8/18; H04W 8/005; H04W 48/12; H04W 48/17; H04L 67/14; H04L 67/22
See application file for complete search history.

(56) References Cited

U.S. PATENT DOCUMENTS

2007/0081477 A1  4/2007  Jakkahalli
2008/0130595 A1  6/2008  Abdel-Kader (Continued)

*Primary Examiner* — Mewale A Ambaye
(74) *Attorney, Agent, or Firm* — Straub & Straub; Michael P. Straub; Stephen T. Straub

(57) ABSTRACT

A computer-implemented method comprising posting, by a communicating device, to a database content associated with a set of information strings, said information strings selected from a set of information strings carried in a set of wireless signals received by device from broadcast stations; querying, by a second communicating device, the database for content associated with a set of information strings, said information strings selected from a set of information strings carried by a set of wireless signals received by the second communicating device; and receiving, by the second communicating device, the content from said database system, said content having been associated with an overlapping set of information strings in said database system.

4 Claims, 2 Drawing Sheets

Related U.S. Application Data

12, 2014, provisional application No. 61/838,110, filed on Jun. 21, 2013.

(56) References Cited

U.S. PATENT DOCUMENTS

| | | |
|---|---|---|
| 2009/0011743 A1 | 1/2009 | Johanson et al. |
| 2009/0279492 A1 | 11/2009 | Montemurro et al. |
| 2011/0047603 A1* | 2/2011 | Gordon .................. H04L 63/06 726/5 |
| 2013/0124309 A1* | 5/2013 | Traasdahl ............... H04L 67/22 705/14.49 |
| 2013/0128811 A1* | 5/2013 | Bradish ............... H04W 68/005 370/328 |
| 2014/0082211 A1* | 3/2014 | Raichelgauz ......... H04L 65/608 709/231 |
| 2014/0181245 A1 | 6/2014 | Richardson et al. |
| 2014/0194153 A1 | 7/2014 | Salkintzis |

\* cited by examiner

1

SUPPORTING PROXIMAL COMMUNICATION BETWEEN COMMUNICATION DEVICES AND BROADCAST STATIONS

RELATED APPLICATIONS

The present application claims the benefit of U.S. Provisional Patent Application Ser. No. 62/056,986 filed on Sep. 29, 2014; claims the benefit of U.S. Provisional Patent Application Ser. No. 62/057,012 filed on Sep. 29, 2014; claims the benefit of U.S. Provisional Patent Application Ser. No. 62/060,201 filed on Oct. 6, 2014; is a continuation in part of U.S. patent application Ser. No. 14/617,983 filed on Feb. 10, 2015 and which issed as U.S. Pat. No. 9,693,222 on Jun. 27, 2017 and which claims the benefit of U.S. Provisional Patent Application Ser. No. 61/938,836 filed on Feb. 12, 2014; is a continuation in part of U.S. patent application Ser. No. 14/620,590 filed on Feb. 12, 2015 and which issued as U.S. Pat. No. 9,743,436 on Aug. 22, 2017 and which claims the benefit of U.S. Provisional Patent Application Ser. No. 61/939,032 filed on Feb. 12, 2014; is related to U.S. patent application Ser. No. 14/610,250, filed Jan. 30, 2015; is related to U.S. patent application Ser. No. 14/603,876, filed Jan. 23, 2015; is related to U.S. patent application Ser. No. 14/610,102, filed Jan. 30, 2015; and is related to U.S. patent application Ser. No. 14/614,723, filed Feb. 5, 2015. Each of the above listed patent applications are hereby expressly incorporated by reference herein in their entireties.

TECHNICAL FIELD

The present invention relates generally to capturing and storing data transmitted by wireless devices.

SUMMARY

In one embodiment, a computer-implemented method comprises posting, by a communicating device, to a database content associated with a set of information strings, said information strings selected from a set of information strings carried in a set of signals received by device from broadcast stations; querying, by a second communicating device, the database for content associated with a set of information strings, said information strings selected from a set of information strings carried by a set of signals received by the second communicating device; and receiving, by the second communicating device, the content from said database system, said content having been associated with an overlapping set of information strings in said database system.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

Figure 1:
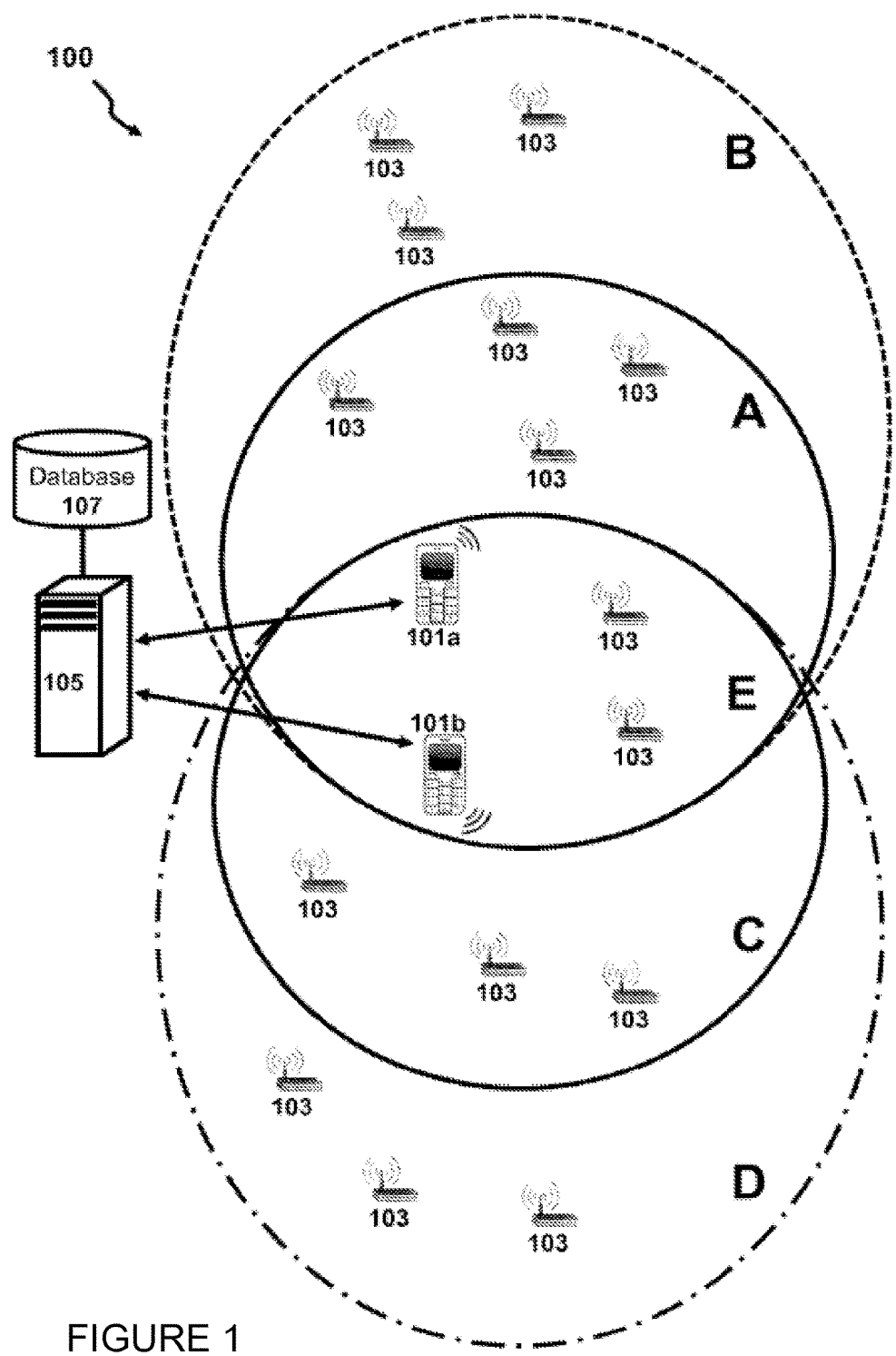
FIG. 1 shows a logical diagram of an exemplary embodiment of a system that stores content in association with certain wireless signals.

The subject matter described herein generally relates to, and incorporates by reference, International Patent Application Serial No. PCT/US2013/068872, entitled "System and Method for Storing and Retrieving Information Associated with a Network Location," filed Nov. 7, 2013; U.S. Provisional Patent Application Ser. No. 61/938,845, entitled "Methods and Systems for Managing IDS in WNS Using API," filed Feb. 12, 2014; U.S. Provisional Patent Application Ser. No. 61/968,585, entitled "Methods and Systems for Managing IDS in WNS Using API," filed Mar. 21, 2014; and U.S. Provisional Patent Application Ser. No. 61/938,836, entitled "Methods and Systems for Associating Social Media to Device Identifiers," filed Feb. 12, 2014. As mentioned, each of these previously filed patent applications are incorporated by reference in their entirety.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Systems described herein may provide users and/or owners of communicating devices, which may be any fixed or mobile electronic device capable of executing instructions stored in memory or received from another device (e.g., smart phones, cellular phones, mobile phones, tablet computers, personal data assistants, laptop computers, gaming consoles), with the ability to store content in association with one or more information strings, on a network-accessible database.

FIG. 1 shows a logical diagram of an exemplary embodiment of a system 100 that stores content in association with certain wireless signals. Such a system 100 may comprise communicating devices 101 (fixed or mobile), broadcast stations 103 (fixed or mobile), a server 105, and a database 107. Signal spaces B, D may represent the proximity range that communicating devices 101 may receive wireless signals from broadcasting stations 103. As such, based on the location of the relevant communicating device 101, zero or more broadcasting stations 103 may reside within the range of signal spaces B, D. For example, a first device 101a may receive signals from a set of broadcasting stations 103 located within a first signal space B, which may represent the proximity at which the first device 101a may receive wireless signals. A second device 101b may likewise receive signals from a set of broadcasting stations 103 located within a second signal space D, which may be associated with the second device 101b. Under certain circumstances, detailed further below, communicating devices 101 may transmit content to a server 105 for storage in a database 107. Along with the content, communicating devices 101 may further transmit information strings carried by a subset A, C of signals in the relevant signal space B, D. That is, communicating devices 101 may transmit to the server, content and one or more information strings associated with the content. The server 105 may then store these materials in the database 107. The server 105 may also forward queries from communicating devices 101 to the database 107. In some cases, the server 105 may execute one or more modules causing the server 105 to actively identify devices, content, and information strings, such that the server 105 and communicating devices 101 may automatically execute certain software routines when the server 105 receives some specified information string and/or content.

Communicating devices 101 may be any fixed or mobile electronic device comprising a non-transitory machine-readable storage medium, a processor, and software modules, capable of proximal communication and performing various processes described herein. Communicating devices 101 may comprise a wireless interface (e.g., chip, card) capable of communications via one or more wireless communications protocol (e.g., 802.11, Bluetooth®, ZigBee, LTE, 3G, 4G). Non-limiting examples of communicating devices 101 may include a smartphone, tablet, laptop, desktop workstation, or the like. Communicating devices 101 may receive wireless signals from broadcast stations 103 proximately located to the communicating device 101. Using a suitable algorithm, communicating devices 101 may examine information strings carried by each of the received wireless signals in order to identify those information strings that meet certain factors, thus identifying a subset of signals A, C carrying the information strings selected according to the predetermined factors.

The extent to which communicating devices may be represented as signal spaces B, D in FIG. 1. That is, signal spaces B, D may represent the boundaries at which communicating devices 101 receive wireless signals. It should be appreciated that the extent at which communicating devices 101 may receive wireless signals may be based on a number of factors, such as the wireless protocols used, physical obstructions, power levels of communicating device 101 and/or the broadcast station 103, and the like. For example, a communicating device 101, such as a smartphone may be capable of 4G cellular or 4G direct communications, Wi-Fi communications and Bluetooth® communications. As such, it can be appreciated that communicating devices 101 may have a plurality of wireless communication technologies. Consequently, in the present embodiment, the signal space B, D of a communicating device 101 may comprise a hybridization of a plurality of the wireless communication technologies that may be implemented by a communicating device 101. The signal space B, D of the communicating device 101 may therefore represent the set of signals received by the communicating device 101 for the plurality of wireless technologies compatible with the communicating device 101.

Subsets of signals A, C may be a collection of one or more signals that carry a information string selected based on one or more factors. Subsets A, C may also be selected through any other process for selecting a subset from a population, such as test groups and control groups, threshold scoring, filtering based on corresponding criteria, and the like. In some embodiments, a user may be capable of manually selecting a subset A, C.

A broadcast station 103 may be any computing device comprising a non-transitory machine-readable storage medium, a processor, and software modules, capable of performing the various processes described herein. Broadcast stations 103 may transmit wireless signals using any suitable protocol, such as WiFi (802.11), Bluetooth®, NFC, 3G, 4G, LTE, ZigBee, RFID, OFID, and the like. Non-limiting examples of broadcast stations 103 may include WiFi routers, iBeacons®, RFID tags, cellular base stations, or any other wireless-enabled device broadcasting or transmitting a information string. Broadcast stations 103 may also include mobile communications and telecommunications devices, including cellular phones, tablets, laptops, watches, cars, among other products capable of wireless communications. All forms of wireless devices (fixed and mobile) may be broadcast stations 103. Broadcast stations 103 may broadcast, or otherwise transmit, a wireless signal that carries an information string containing information that identifies and/or describes the originating broadcast station 103. A communicating device 101 may select a subset of signals A, C carrying information strings determined using a set of factors, such as the MAC address of the broadcast station 103, the IP address of the broadcast station 103, the name of the business or entity associated with the broadcast station 103, information describing the business or entity associated with the broadcast station 103, among others. In some cases, these types of data may be parsed and stored as data fields in a record of a database 107. In some cases, broadcast stations 103 may transmit signals that are within a subset of overlapping signals E, which may be a set of one or more signals that are within range of a plurality of mobiles devices 101, i.e., in each signal space B, D; and are interesting to the plurality of communicating devices 101, i.e., the signals are in each subset of signals A, C. That is, signals from broadcast stations 103 are in the subset of overlapping signals E when signals are physically received by the communicating devices 101, and the signals logically carry a information satisfying both communicating devices' 101 requirements to be in the subsets of signals A, C, which are themselves subsets of the signal spaces B, D, respectively. Mathematically-speaking, the first signal set B is a superset of the first subset of signals A, which is a superset of the subset of overlapping signals E, which is subset of the second subset of signals C, which is a subset of the second signal space D, represented as: $B \supseteq A \supseteq E \subseteq C \subseteq D$.

In some cases, a first communicating device 101a may publish content associated with information strings coming from the corresponding subset of signals A. This content may be stored into database 107. Later, a second device 101b, and in some cases the first device 101a, may request any content from the database 107 associated information strings coming from a second subset of signals C, which may happen to be in an overlapping subset of signals E. In some embodiments, using this overlap, communicating devices 101 may be capable of indirectly transmitting content (via the intermediate database 107). That is, the content stored in the database 107 may flow from a first device 101a to a second device 101b, through the database 107, because of the mutually overlapping subset of signals E, which are mutually-proximate signals to both devices 101a, 101b, and carry information strings in both devices' 101a, 101b subset of signals A, C.

A server 105 may be any computing device comprising a non-transitory machine-readable storage medium, a processor, and software modules, capable of performing the various processes described herein. The server 105 may function as a central controller for the system 100, which may handle certain administrative tasks, such as monitoring functionality of the system 100, preparing application installations for communicating devices 101, identifying communicating devices 101 registered with the system 100, among other possible functions. The server 105 may forward database queries sent from communicating devices 101, and may transmit query results back to the communicating devices 101. In some embodiments, the server 105 may actively identify communicating devices 101 that receive information strings carried by an overlapping subset of signals E. In such embodiments, the server 105 may then trigger certain software processes to be executed on the communicating device 101 and/or on the server 105. It should be appreciated that embodiments of the system 100 may comprise one or more servers 105.

Databases 107 may be any computing device comprising a non-transitory machine-readable storage medium, a processor, and software modules, capable of performing the various processes described herein. It should be appreciated that a database 107 may be embodied on the same physical device as the server 105, or may reside on a distinct computing device capable of performing the tasks and processes described herein. Examples of a database 107 may include Cassandra, MariaDB, MySQL, PostgreSQL, SQLite, Microsoft SQL Server, Microsoft Access, Oracle, SAP, dBASE, FoxPro, IBM DB2, LibreOffice Base, File-Maker Pro and/or any other type of database that may organize collections of data on a non-transitory machine-readable storage medium. The database 107 may be accessed or managed by an administrative user of the system 100, and may be interacted with over a network using a set of APIs associated with the system 100, which may be executed by communicating devices 101 or other computing devices of the system 100.

A database 107 may store records containing data extracted from information strings, which may describe the source of the information strings (e.g., IP address, MAC address, SSID, iBeaconID, LTE-Direct Identifiers). Records may also contain content associated with one or more information strings. New records may be generated and existing records may be updated upon receiving content and information strings from a communicating device 101. Database 107 management software may determine whether new record must be generated or an existing record must be updated, based in part on commands received from the communicating device 101 and/or the server 105. The database 107 may also respond to queries for content associated with information strings, submitted by communicating devices 101 searching for any content that may be related to a signal received from a broadcast station 103. As an example, after a first communicating device 101a has selected a first subset of signals A from the first signal space B, the first device 101a may query the database 107 using the information strings carried by the signals of the first subset A. In some cases, if the database 107 locates content associated with the information strings, the database 107 will return such content to the first communicating device 101a.

As an example, a first user associated with a first communicating device 101a may be located at a first coffeehouse, and a second user associated with second communicating device 101b may be located nearby at a second coffeehouse. Due to the physical distance separating the communicating devices 101a, 101b, each may receive a different set of wireless signals, from various broadcast stations 103. Thus, the first communicating device 101a may receive a set of signals from broadcast stations 103 in the first signal space B, i.e., within the first communicating device's 101a range for reception. Similarly, the second communicating device 101b may receive a set of signals from broadcast stations 103 within the second signal space D. But, even though the communicating devices 101a, 101b receive different sets of signals, the communicating devices 101a, 101b may receive a subset of one or more overlapping signals E from broadcast stations 103 falling within an overlapping proximity area, due to the shared wireless proximity of the two communicating devices 101a, 101b. In this example, the first coffeehouse and the second coffeehouse both host WiFi networks that transmitting signals received by the communicating devices 101a, 101b. Thus, the WiFi access points for these networks constitute a subset of overlapping signals E because the signals are received within the overlapping proximity area.

In this example, the first communicating device 101a may select to send and receive content relating to coffeehouses, to a server 105 hosting a content delivery system 100. The first communicating device 101a may have a software application associated with the system 100, which may permit the first device to communicate with the server 105 in order to upload, to a database 107, content associated with information strings related to coffeehouses, and/or query the database 107 for stored content associated with information strings related to coffeehouses. Due to the factors used by the first communicating device 101a, the first device 101a may select a first subset of signals A that includes signals from broadcast stations 103 related to coffeehouses, according to the information strings of those broadcast stations 103.

In this example, these second communicating device 101b may select to send and receive content relating to coffeehouses, to the server 105. That is, the application settings of the second communicating device 101b may select a second subset of signals C, which may contain signals carrying information string identifying the broadcast station 103 as being related to a coffeehouse, which may include signals sent from the broadcast stations 103 of the first and second coffeehouses.

In this example, the software application of the content delivery system 100 may host a proximal messaging exchange, in which users may generate and store messages in a database 107 to be later retrieved by, or transmitted to, communicating devices 101a, 101b. The first user may wish to prepare and store a message encouraging others to patronize the first coffeehouse. Using the software application on the first communicating device 101a, the first user may generate the message, and then select a first subset of signals A to associate with the message. The first subset of signals A may be wireless signals originating from broadcast stations 103 within the first device's 101a signal space B. The signals of the first subset A may carry information strings that identify the source broadcast stations 103 as coffeehouses. The first device 101a may then associate the message (i.e., content) with the information strings carried by the signals of the first subset A, which the first device 101a transmits to a server 105 for storage in a database 107. The database 107 may store the message and the information string into a record that may be later retrieved by a second communicating device 101b, or updated by the first communicating device 101a.

A second device 101b executing a software application of the system 100 may be configured to filter signals from the second device's 101b signal space D, based on a set of factors selected by the second user, or automatically generated based on a number of user settings. Filtering the signals from the second signal space D may result in a second subset of signals C that, based on the factors, carry information strings of interest to the second device 101b. When the second user enters the second coffeehouse, the second communicating device 101b receives signals from broadcast stations in the second signal space D, which includes the broadcast stations 103 of both the first and second coffeehouses, among other sources of wireless signals. The second device 101b may apply an algorithm and factors to distill a second subset of signals C interesting to the second device 101b. This second subset of signals C may also include the signals originating from broadcast stations 103 of the first and second coffeehouses. Accordingly, the broadcast stations 103 of the first and second coffeehouses fall within an overlapping subset of signals E, because these wireless signals originate from broadcast stations 103 within both of the signal spaces B, D, and because the information strings of these signals meet the filtering criteria that placed these signals within both the first and second subsets of signals A, C.

After identifying the overlapping subset of signals E, the second device 101b may transmit the information strings of the first and second coffeehouses to the server 105 to query whether the database 107 contains any messages associated with the information strings from the subset of overlapping signals E. In this example, the database 107 would identify the record associated with the first coffeehouse, based on the information string from the first coffeehouse's broadcast station 103. After retrieving the appropriate record from the database 107, the server 105 would then return to the second device 101b the first user's positive message about the first coffeehouse, which may be displayed on a suitable interface for the second user to review.

Figure 2:
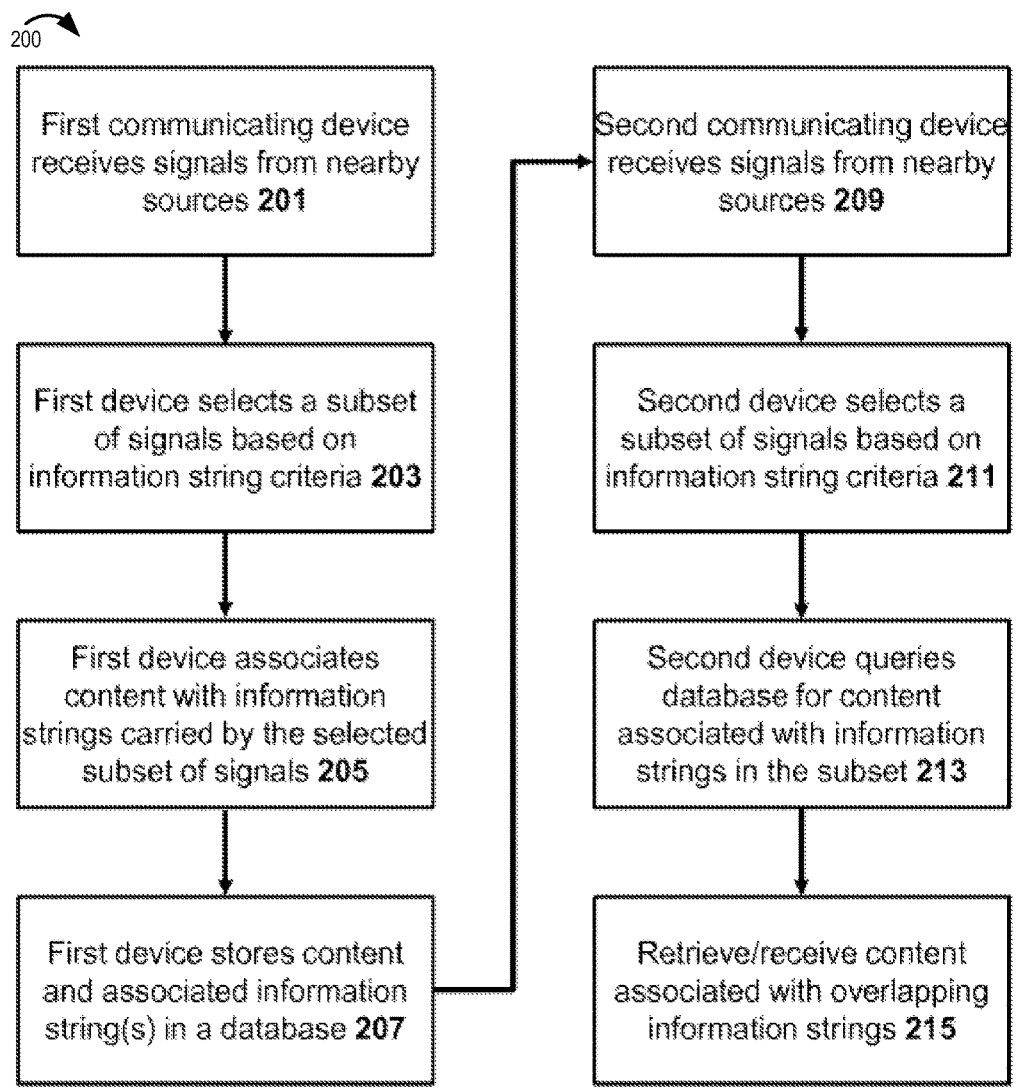
FIG. 2 shows a flowchart of a series of steps performed by devices of a system, according to an exemplary embodiment.

FIG. 2 shows a flowchart of a series of steps performed by devices of a system, according to an exemplary embodiment.

In a first step 201, a first communicating device may receive one or more signals from nearby wireless signal sources, which may be broadcast stations, or other fixed or mobile communicating devices broadcasting wireless signals within a proximity to the first device that the device may capture and comprehend the signal. Wireless signals may carry an information string comprising one or more types of information (e.g., SSID, MAC, IP) about the source device broadcasting the wireless signal.

In a next step 203, the first device may select from all of the signals, a subset of one or more signals based on an analysis of the information string of each of the signals. That is, based on one or more factors related to the data in the information strings carried by the received signal, e.g, one or more strings per signal, the first device may analyze the information string or strings carried by each of the signals to determine which of the received signals are suitable for purposes of achieving the desired content association and possible subsequent delivery to another device via the database.

In a next step 205, the first device may associate content with the information strings carried by the subset of signals. After selecting the subset of signals, the first device may then associate with that subset of signals, some type of content (e.g., data, multimedia file, encryption key, executable file, message). In some cases, the first device may associate a set of one or more information strings with a single piece of content. In some cases, the first device may associate a set of one or more pieces of content with a single information. And, in some cases, a plurality of information strings may be associated with a plurality of pieces of content.

In a next step 207, the first device may store the content and the set of one or more associated information strings into a database, e.g, a database including a processor capable of storing content in a manner that allows the content to be accessed based on a match with one or more information strings associated with the content. That is, after associating content with one or more a information strings, the first device may transmit the content to a server for storage in a database. In some embodiments, the first device may transmit the content and the information strings to the server for storage in the database, which results in the association of the content to the set of information strings.

In a next step 209, a second communicating device may receive one or more wireless signals from nearby wireless signal sources, within the reception range of the second communicating device. This second set of one or more wireless signals may be any suitable type of wireless signal within the signal space of the second communicating device. The wireless signals received by the second communicating device may carry a information string, which may be analyzed by the second communicating device.

In a next step 211, the second device selects a second subset of signals based on a set of factors related to the information string of each of the wireless signals. When selecting the second subset of signals, the second device may apply the same or different algorithm as was used by the first device to select the first subset of signals. Likewise, the second subset may be based on the same or different factors as the first subset of signals.

In a next step 213, after selecting a second subset of signals, the second device may query the database for content associated with one or more of the information strings carried by one or more signals of the second subset.

The database may, and in some embodiments does, compare the information strings in the received query to information strings associated with stored content to determine if there is a match. The database may then respond to the device which sent the query with the content determined to match the information strings in the received query. In this manner the second device may receive content that was supplied by another device, e.g., a first device, and associated in the database with one or more information strings communicated by signals received by the second device.

In step 215, the second device receives content associated with information strings from an overlapping subset of signals with the first communicating device. The overlapping subset of signals may and sometimes do communicate information strings which fully or partially match the information associated in the database with the returned content. The content may be and sometimes is presented to the user on a user interface, e.g., a display included in the second device, for the user to review. In some embodiments, the content may trigger an application. In some embodiments, the content may be machine-readable data intended to be consumed by the second device for the execution of a software process. In other words, the content is not limited to text-based message, but may be any combination of binary data that may be consumed, used, and/or displayed by the second device. In some embodiments, a server may detect the presence of the second communicating device querying the database with a certain subset of overlapping signals, which may then automatically trigger one or more processes to be executed by the server and/or by the second communicating device.

Various embodiments are directed to a communications method, comprising receiving signals, at a first device, each received signal carrying an information string; selecting a subset of received signals, said subset of received signals communicating a first set of information strings; associating content with the first set of information strings; storing said content in a database which associates the first set of information strings with the first content. In some embodiments the method further includes operating the first device, e.g., a wireless communications device, to transmitting the content and first set of information strings to the database, e.g., for storage and association with the first set of strings. In some such embodiment the database stores the content to be associated with the first set of information strings in memory in said database, e.g., along with said first set of information strings. The database can compare information, e.g., one or more information strings, included in a query to the information strings associated with the stored content and can respond to a query when a match is determined to occur. Thus in some embodiments the method further includes operating the database to receive a query from a second communications device, said query including a second set of information strings carried in signals received by the second device. The second set of information strings maybe and sometimes do correspond to information strings in a subset of signals that were received by the second device and selected, based on one or more user controlled criteria, for use in generating a content request query that is to be sent to the database. In some embodiments a processor in the database compares the second set of strings to sets of strings associated with content stored in the database to identify content corresponding to the second set of strings. For example, the information strings in the second set of information strings included in the query are compared to the first set of information strings associated in the database with the content received form the first device. The processor in the database responds to the received query with content determined, by said comparing, to correspond to the second set of strings included in the received query. In this manner the second device from which the query was received may be provided with information determined to correspond to the set of signals received by the second device with the correspondence being indicated by the second set of information strings having been determined to correspond to the stored set of information strings associated with the returned piece of stored content. In some embodiments content is determined to correspond to the second set of strings when the set of strings associated with stored content fully matches said second set of strings. A partial match may also be used in some embodiments to determine correspondence between information strings in a query and information strings associated with stored content. For example, in one embodiment stored content is determined to correspond to the second set of strings when the set of strings associated with stored content partially matches said second set of strings. Stored content is determined in some embodiments to correspond to the second set of strings when the set of strings associated with stored content matches the second set of strings, included in a query, by more than 60%.

In the above described manner, a first communications device may receive a first signals and send content to a database to be associated with the received signals. The association can be achieved by way of associating information strings communicated by the first signals with the content. A second device receiving some or all of the first signals, e.g., at another time, can recover information strings from the received signals and send them to the database for matching to stored information, e.g., content stored in the database by the first mobile device. The second mobile device can then receive the associated content from the data base and thereby obtain the content which the first device associated with the first signals and/or the information strings communicated by the first signals.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "tracking" or "associating" or "displaying" or "interacting" or "operating" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably.

The embodiments described above are intended to be exemplary. One skilled in the art recognizes that numerous alternative components and embodiments that may be substituted for the particular examples described herein and still fall within the scope of the invention. While various embodiments have been discussed above, it should be appreciated that not necessarily all embodiments include the same features and some of the features described above are not necessary but can be desirable in some embodiments.

Servers, databases, communications devices and other devices in the exemplary system in some embodiments each include a processor, memory and interface with such components in a device being are coupled together, e.g., by a bus and with the interface of the device coupling the device to other devices allowing the device to receive and send signals and/or information. The processor controls the device in which it is included to operate in accordance with the invention, e.g., in the manner described herein.

Various embodiments are possible beyond those which have already been described and the invention is not limited to the particular examples which have been discussed above.

In the above described methods, in some embodiments, each step may be performed by one or more different software instructions executed by a computer processor, e.g., a central processing unit (CPU). At least one system implemented in accordance with the present invention includes a means for implementing each of the various steps which are part of the methods of the present invention. Each means may be, e.g., an instruction, processor, hardware circuit and/or combination of elements used to implement a described step.

Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A communications method, comprising:
receiving, at a first communications device, signals, said first communications device being a mobile device, each received signal carrying an information string;
selecting, at the first communications device, a subset of received signals, said subset of received signals communicating a first set of information strings;
associating, at the first communications device, first content in the form of a message with the first set of information strings;
communicating, the first content associated with the first set of information strings, from the first communications device to a server for storage in a database;
storing, by the server, said first content in the database which associates the first set of information strings with the first content;
receiving, by the server, a query from a second communications device, said query including a second set of strings, said second set of strings being from signals received by said second communications device, said query seeking content associated in said database with the second set of strings, said second set of strings including a string received in a signal coverage area into which at least one of the signals received by the first communications device is transmitted;
communicating, from the server, the query received from the second communication device to the database;
comparing, by a processor in the database, the second set of strings to sets of strings associated with content stored in the database to identify content corresponding to the second set of strings;
the database responding to the query communicated by the server with content determined, by said comparing, to correspond to the second set of strings; and responding, by the server, to said query by returning to the second communications device said first content associated with said first set of strings.

2. The method of claim 1, wherein content stored in the database is determined to correspond to the second set of strings when the set of strings associated with content stored in the database fully matches said second set of strings.

3. The method of claim 1, wherein content stored in the database is determined to correspond to the second set of strings when the set of strings associated with stored content partially matches said second set of strings.

4. The method of claim 1, wherein content stored in the database is determined to correspond to the second set of strings when the set of strings associated with stored content matches said second set of strings by more than 60%.

* * * * *